United States Patent
Bieber et al.

(10) Patent No.: US 11,015,706 B2
(45) Date of Patent: May 25, 2021

(54) METHOD AND DEVICE FOR CONTROLLING A TRANSMISSION OF A WORKING MACHINE

(71) Applicant: ZF Friedrichshafen AG, Friedrichshafen (DE)

(72) Inventors: Sven Bieber, Markdorf (DE); Andreas Schwarz, Langenargen (DE); Thomas Kurz, Langenargen (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 0 days.

(21) Appl. No.: 16/869,781

(22) Filed: May 8, 2020

(65) Prior Publication Data
US 2020/0355263 A1 Nov. 12, 2020

(30) Foreign Application Priority Data
May 9, 2019 (DE) .................. 10 2019 206 658.5

(51) Int. Cl.
| | |
|---|---|
| *F16H 61/02* | (2006.01) |
| *B60W 10/30* | (2006.01) |
| *B60W 10/101* | (2012.01) |
| *B60W 20/30* | (2016.01) |

(52) U.S. Cl.
CPC ....... *F16H 61/0213* (2013.01); *B60W 10/101* (2013.01); *B60W 10/30* (2013.01); *B60W 20/30* (2013.01)

(58) Field of Classification Search
None
See application file for complete search history.

(56) References Cited

U.S. PATENT DOCUMENTS

| | | | | |
|---|---|---|---|---|
| 4,206,829 A * | 6/1980 | Melocik | ............... | B66F 17/003 180/290 |
| 4,411,582 A * | 10/1983 | Nakada | ............... | B66F 9/24 187/222 |
| 4,511,974 A * | 4/1985 | Nakane | ............... | G01G 19/083 340/685 |
| 6,050,770 A * | 4/2000 | Avitan | ............... | B66F 17/003 187/242 |
| 6,170,341 B1 * | 1/2001 | Avitan | ............... | B66F 17/003 73/862.392 |

(Continued)

FOREIGN PATENT DOCUMENTS

| | | |
|---|---|---|
| DE | 11 2013 005 124 T5 | 8/2015 |
| DE | 10 2015 115 704 A1 | 3/2017 |
| DE | 10 2016 224 076 A1 | 6/2018 |

OTHER PUBLICATIONS

German Search Report issued in corresponding German Patent Application No. 10 2019 206 658.5 dated Sep. 30, 2020.

*Primary Examiner* — Dirk Wright
(74) *Attorney, Agent, or Firm* — Finch & Maloney, PLLC; Michael J. Bujold

(57) ABSTRACT

A method for controlling the transmission of a working machine, by which, with at least one sensor of the working machine, at least one specific parameter is determined and transmitted to a control unit for controlling the transmission. The working machine has a lifting mechanism and the at least one specific parameter which characterizes an actuation condition of the lifting mechanism. A predetermined shifting strategy is adapted, by the method, as a function of the at least one specific parameter.

10 Claims, 1 Drawing Sheet

(56) References Cited

U.S. PATENT DOCUMENTS

| | | | |
|---|---|---|---|
| 6,945,745 B2* | 9/2005 | Retzlaff | B66F 9/082 414/636 |
| 7,475,753 B2* | 1/2009 | Oka | B60W 10/06 180/306 |
| 7,524,268 B2* | 4/2009 | Oka | B60K 28/08 477/169 |
| 7,568,547 B2* | 8/2009 | Yamada | B66F 9/07572 180/282 |
| 8,140,228 B2* | 3/2012 | McCabe | B66F 9/24 701/50 |
| 8,775,034 B2* | 7/2014 | Hyodo | E02F 9/2079 701/50 |
| 9,097,344 B2* | 8/2015 | Hoff | E02F 9/2253 |
| 9,556,590 B2* | 1/2017 | Moriki | E02F 9/22 |
| 10,041,229 B2 | 8/2018 | Cai et al. | |
| 10,427,692 B2* | 10/2019 | Addison | B60W 50/06 |
| 10,544,565 B2* | 1/2020 | Berry | B60K 17/356 |
| 10,704,223 B2* | 7/2020 | Aoki | E02F 9/2253 |
| 2007/0080025 A1 | 4/2007 | Yamada et al. | |
| 2014/0330490 A1* | 11/2014 | Aoki | E02F 9/2079 701/50 |
| 2017/0073923 A1 | 3/2017 | Aoki et al. | |
| 2020/0198948 A1* | 6/2020 | Choi | B66F 9/22 |

* cited by examiner

METHOD AND DEVICE FOR CONTROLLING A TRANSMISSION OF A WORKING MACHINE

This application claims priority from German patent application serial no. 10 2019 206 658.5 filed May 9, 2019.

FIELD OF THE INVENTION

The present invention relates to a method and a device for controlling a transmission in the drive-train of a working machine. As a rule working machines have accessory equipment or some other working hydraulic system which has to be supplied with power by a drive input element. Thus, by way of the drive input element (electric motor, internal combustion engine) of the working machine, not only sufficient drive input power has to be supplied for the driving function but at the same time a supply of power has to be ensured for the accessory equipment or working hydraulic system. At the same time, in any operating condition it must be ensured that an optimum transmission ratio of the drive input power of the drive input element is provided, and in particular this happens by virtue of a transmission. During this, when operating the working hydraulic system and the driving function, in particular overloading of the drive input element should be avoided.

BACKGROUND OF THE INVENTION

Accessory equipment can be driven by a working hydraulic system or even electrically by a motor/generator unit, wherein the generator is then driven by the working hydraulic system or directly by the drive input element. In particular, in the case of a wheel loader the lifting mechanism can be a scoop, and a forklift truck, for example, comprises a lift mast with appropriate take-up means (fork).

From DE 10 2016 224 076 A1 a method for determining a position of a bagger arm by means of a LIDAR system is known. With reference to position data, movement sequences of the bagger arm can be detected. Furthermore, with reference to the LIDAR system the surroundings of the bagger can be detected, whereby the bagger arm can be controlled partially or fully automatically.

Furthermore, DE 10 2015 115 704 A1 discloses an agricultural working machine with a sensor system and an evaluation unit arranged on it, such that a position of an accessory unit relative to a body of the working machine can be determined by the sensor system. By means of the sensor system a long measurement range can be covered. This has the advantage that independently of the exact vertical arrangement for example of its swing arms, the front loader can be reliably registered since its measurement ranges detect a vertical strip. Furthermore a steering system connected to the sensor system is provided, by means of which on the basis of the distances determined by the sensor system the working machine can be steered and/or driven automatically when taking up and/or putting down the accessory unit.

From U.S. Pat. No. 10,041,229 B2 a system for controlling a machine such as a wheel loader is known. The system comprises an image detection device and a control system, wherein the control system communicates with the image detection unit. The control system registers working cycles of the wheel loader, which cycles include a take-up of material with the scoop and subsequent emptying of the scoop. The control system further identifies a pile of material in the surroundings of the machine and a distance between the wheel loader and the pile. The control system emits a shifting demand for downshifting a transmission system of the wheel loader when the distance becomes less than a predefined value and the scoop has been emptied in the previous working cycle.

DE 11 2013 005 124 T5 discloses a machine drive-train with a transmission and a control device. The control device selectively varies a gear ratio of a transmission in response to a corresponding shifting signal. A control unit monitors lifting and travel speed signals, compares them with predetermined values and authorizes a gear ratio change when an actual value is within a defined value range, such that the gear ratio of the transmission is changed and in particular a downshift takes place.

SUMMARY OF THE INVENTION

The purpose of the present invention is to be seen as providing an improved method for controlling a transmission of a working machine. In particular comfort should be increased during the operation of the working machine and wear and unsafe operating conditions of the working machine should be avoided.

To achieve this objective a method according to the independent claim(s) is proposed, wherein by means of at least one sensor of the working machine at least one specific parameter is provided and transmitted to a control unit for controlling the transmission. The working machine comprises a lifting mechanism and the at least one specific parameter characterizes an actuation condition of the lifting mechanism. As a function of the at least one specific parameter, a predetermined shifting strategy of the transmission is adapted.

Besides path-measuring, acceleration, position, height or pressure sensors, the at least one sensor can be a suitable radar, Lidar or some other image-forming sensor (such as a camera). Suitable load sensors are also conceivable, above all to detect a load on the take-up means. The at least one sensor is fixed on the working machine. This includes in particular attaching it in and/or on the lifting mechanism. However, the at least one sensor can also be attached in and/or on the working hydraulic system. When a radar, Lidar or image-forming sensor is used, it is most suitable of all to fix it in and/or on the working machine in a cabin of the working machine.

An operating condition is for example understood to mean whether the lifting mechanism is in a retracted or extended position, a load condition (partially or fully loaded, or empty), or even information about whether a change of the actuation condition is to be expected. Such a change of the actuation condition can be detected for example with reference to a change in the value of the at least one specific parameter. Besides the at least one specific parameter that characterizes the actuation condition, other parameters too can be taken into account, in particular ones which describe drive-dynamical parameters of the working machine (such as speed, driving round a bend, speed changes, navigation specifications, condition/power parameters of the drive element and/or the transmission) or environmental parameters (temperature, road condition, humidity).

By combining these further parameters with the at least one parameter, particularly good estimates regarding expected actuation condition changes can be made. For example, when a load on the lifting mechanism has been detected, a lifting mast is retracted and the driving speed of the working machine is reduced, it can be concluded that an unloading process is imminent.

The control unit to which the at least one specific parameter is supplied can be in particular a transmission control unit. Alternatively it can be a higher-level vehicle control unit of the working machine, a so-termed vehicle master-computer. The control unit can be arranged centrally on the transmission or in a decentralized position somewhere else in the working machine.

A lifting mechanism is understood to be, for example, a boom or a lifting mast on which suitable take-up means are fixed for taking up a load. This can be a fork (particularly in the case of a forklift truck or a telehandler), or a scoop (particularly on a wheel loader). However, other take-up means as well are included, especially ones suitable for taking up piece goods or bulk material.

With regard to the method according to the invention, a shifting strategy is understood to mean a predefined logic for engaging a transmission ratio of the transmission of the working machine. The transmission can be a powershift transmission, a dual-clutch transmission, a continuously variable transmission (CVT) or a power-split transmission (mechanical, hydraulic, mechanical/hydraulic, electric/hydraulic). Correspondingly, a transmission ratio is understood to mean either a specific transmission gear, a driving range or in general a gear ratio between a transmission input and a transmission output (particularly in the case of continuously variable and/or power-split transmissions). Accordingly, having regard to a driving demand and an actuation condition of the accessory equipment or the lifting mechanism, an optimal transmission ratio of the transmission is set. Thus, in accordance with changing requirements it can be necessary to change the transmission ratio.

For this purpose, besides the further parameters according to the invention the at least one specific parameter alone or in combination with the further parameters can be taken into account. Sometimes this has the result that owing to the at least one specific parameter, a shifting strategy different from the predetermined shifting strategy is implemented. In other words, another transmission ratio can be engaged or a transmission ratio change can be suppressed. However, besides a transmission ratio change it can also be provided that depending on the at least one specific parameter the drive-train is opened (for example by opening one or more clutches), or in other cases the opening of clutches can be suppressed.

On the one hand the suppression of a transmission ratio change may contribute toward increasing comfort, but on the other hand an adaptation of a predetermined shifting strategy may take place if, with a knowledge of the at least one specific parameter, a critical condition of the working machine is seen to be likely. This would be the case if the lifting mechanism is in an extended position, which results in a greater risk that the working machine might tip over. A downshift could thus result in a jerky speed reduction and such an impulse increases the risk of tipping over. An upshift too could also increase the risk of tipping over, since sometimes the propulsion acceleration changes. In this connection, a downshift is understood to mean a gear change to a lower transmission gear or the engagement of a higher transmission ratio, whereas an upshift therefore describes a gear change to a higher transmission gear or the engagement of a lower transmission ratio. This occurs above all when the transmission ratio is changed considerably, for example after a downshift through several transmission gears.

In a further development it is provided that the shifting strategy is adapted in such manner that instead of influencing the transmission ratio itself, a shifting dynamic is adapted. This means that for example a less pronounced transmission ratio change is carried out. The carrying out of the transmission ratio change can also be adapted. For example the duration of a transmission gearshift or the opening and/or closing behavior of the clutches can be adapted.

Instead of adapting the shifting dynamics, an intended transmission ratio change can be suppressed. This means that depending on the actuation condition/position of the lifting mechanism sometimes a transmission ratio change is completely suppressed or carried out after a time delay. For example, shifting points or shifting time points are reproduced with reference to a different characteristic than would be provided for in the case of another actuation condition/another position of the lifting mechanism. However, instead of a delayed transmission ratio change it is also conceivable in other situations to bring forward an intended transmission ratio change, i.e. to carry it out at an earlier time. This could for example be arranged in such manner that a transmission ratio change takes place earlier when, due to an actuation demand, the lifting mechanism in an extended position has to be moved, or when with reference to a change in the value of the at least one specific parameter it can be concluded that there has been such an actuation condition change.

Furthermore, by virtue of a particular value of the at least one specific parameter an actuation condition of the lifting mechanism can be inferred. For example, it is possible to differentiate between an (on)-loading process, an unloading process or a transport mode. Particularly in the case of a wheel loader with a scoop on the lifting mechanism, it can be assumed that lowering the lifting mechanism and correspondingly tipping the scoop will very probably be followed by a loading process, i.e. the taking up of bulk material.

Particularly when a wheel loader is driven up a pile, it is extremely important that the propulsion of the working machine is ensured. In such a case opening one or more clutches (clutch cut-off function) has to be suppressed. In contrast, when the lifting mechanism/lifting mast is extended it can be advantageous to open one or more clutches, particularly since for loading/unloading the working machine can then smoothly drive up to the loading/unloading site.

According to a further aspect of the present invention, a device for controlling the transmission of a working machine is proposed. The device comprises at least one control unit and at least one sensor. The sensor and the control unit are connected to one another for the exchange of signals. The control unit is designed to carry out the method according to the invention and to emit a signal for adapting the shifting strategy. Further, a computer program product can be included so that the method is carried out when the source code is run on a computer, in this case the control unit.

In addition the invention relates to a drive-train of a working machine. This includes a drive element and a transmission of the type described to begin with, and a device according to the invention for controlling the transmission.

BRIEF DESCRIPTION OF THE DRAWINGS

The object of the invention will be described in greater detail with reference to the attached figures, which show.

DETAILED DESCRIPTION OF THE PREFERRED EMBODIMENTS

Figure 1:
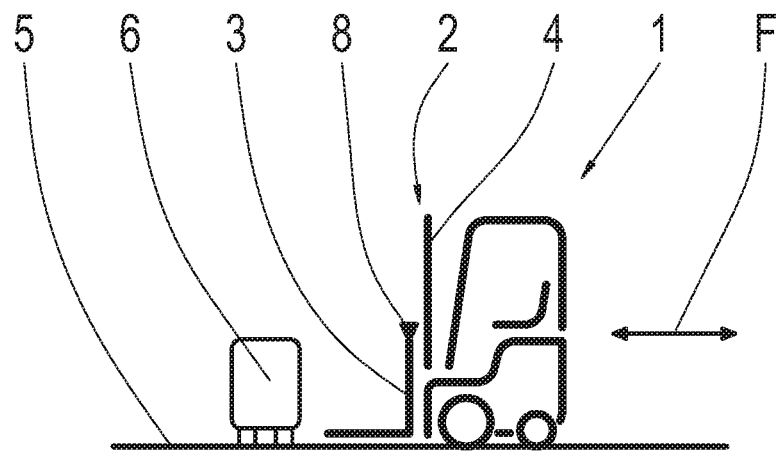
FIG. 1: A schematic representation of a working machine, in a first actuation condition.

FIG. 1 shows a schematic representation of a working machine 1, in this case in the form of a forklift truck. The working machine 1 has a lifting mechanism 2 arranged on the front of the working machine 1. The lifting mechanism 2 consists essentially of take-up means 3 in the form of a fork and a lifting mast 4. Arranged on the take-up means 3 there is a sensor 8, which is provided for detecting and communicating the at least one specific parameter. A working hydraulic system and operating elements for actuating the lifting mechanism 2 are not shown, and the same applies to a drive element and a transmission.

The working machine 1 moves along a driveway 5, which can for example be a rail yard, a shed or even a building site. During this the mobility of the working machine 1 is predominantly characterized by forward or backward movement in a travel direction F. The movement of the working machine 1 in its travel direction F is not restricted to straight driving, but rather, driving round curves or maneuvering processes are sometimes also carried out on site.

By virtue of the take-up means 3, the working machine is suitable for taking up, transporting and putting down a load 6, here in the form of piece goods. In the condition illustrated the lifting mast 4 or lifting mechanism 2 is in a retracted position.

Figure 2:
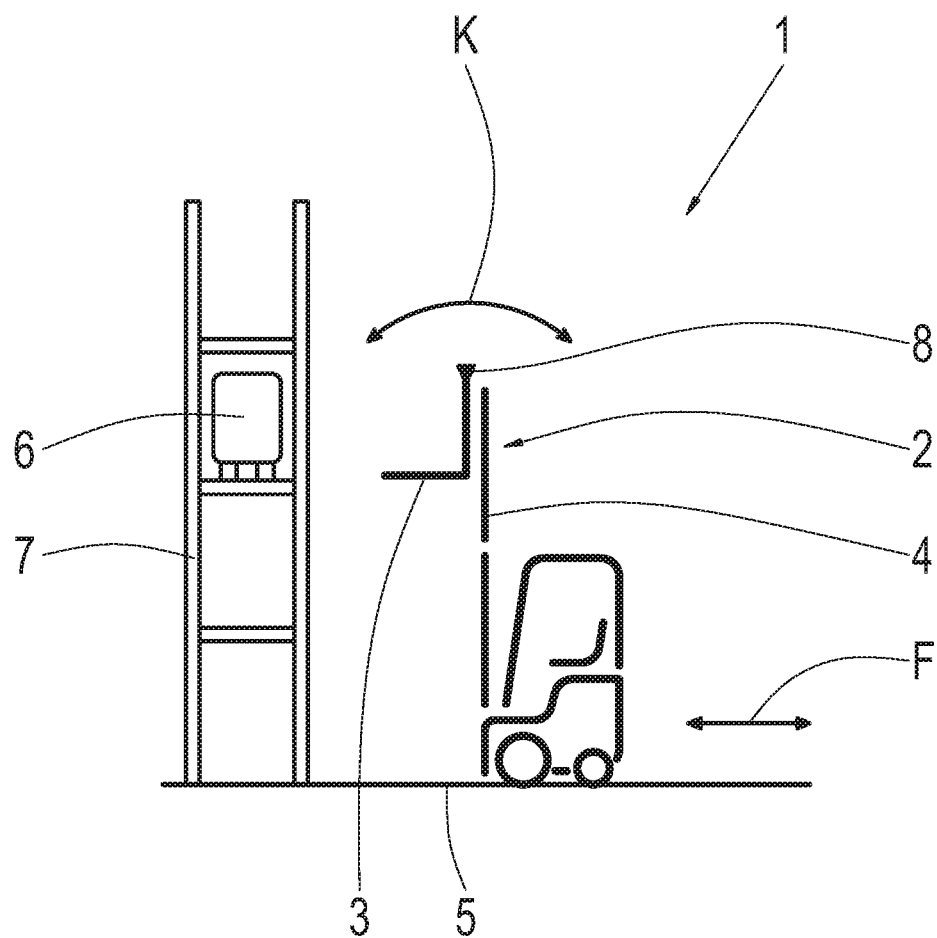
FIG. 2: A schematic representation of a working machine, in a second actuation condition.

FIG. 2 shows the working machine 1 described above in a different situation or different actuation condition of the lifting mechanism 2. In this case the lifting mechanism 2 is in an extended position. Consequently the center of gravity of the working machine 1 is displaced, which increases the tip-over tendency as shown by the arrow K. Here, the tip-over tendency K describes the tendency of the working machine 1 to tilt around an axis transverse to the vehicle (not shown). The axis transverse to the vehicle is perpendicular both to the driveway 5 and to the lifting mast 4.

The tip-over tendency K becomes still greater as soon as the working machine 1 takes up or unloads the load 6. In the example illustrated the load 6 is in a storage element 7, in this case in the form of a (high) bay in a warehouse. However, the storage element 7 could also be a means of transport, such as a truck.

The greater the tip-over tendency K of the working machine 1, the more important it is to adapt the shifting strategy. Thus, in the present case the sensor 8 determines and emits the signal representing the at least one specific parameter, here the position of the lifting mechanism 2 (or the take-up means).

INDEXES

1 Working machine
2 Lifting mechanism
3 Take-up means
4 Lifting mast
5 Driveway
6 Load
7 Storage element
8 Sensor
F Travel direction
K Tip-over tendency

The invention claimed is:

1. A method of controlling a transmission of a working machine having a lifting mechanism, the method comprising:
   determining and transmitting, with at least one sensor of the working machine, at least one specific parameter to a control unit for controlling the transmission, and the at least one specific parameter characterizes an actuation condition of the lifting mechanism, and the actuation condition being a relative position of the lifting mechanism and a load condition of the lifting mechanism, and
   adapting a predetermined shifting strategy as a function of the at least one specific parameter.

2. A method of controlling a transmission of a working machine having a lifting mechanism, the method comprising:
   determining and transmitting, with at least one sensor of the working machine, at least one specific parameter to a control unit for controlling the transmission, and the at least one specific parameter characterizes an actuation condition of the lifting mechanism,
   adapting a predetermined shifting strategy as a function of the at least one specific parameter, and
   adapting the predetermined shifting strategy when, from the characteristic of the specific parameter for carrying out an un-adapted transmission ratio change, a critical condition of the working machine appears to be likely.

3. The method according to claim 1, further comprising adapting a shifting dynamic of a transmission ratio change to carry out a less pronounced transmission ratio change in comparison to the un-adapted transmission ratio change.

4. The method according to claim 1, further comprising suppressing a transmission ratio change.

5. The method according to claim 2, wherein the transmission ratio change is a downshift or an upshift.

6. The method according to claim 1, further comprising inferring a current operating condition of the working machine based on the at least one specific parameter.

7. The method according to claim 1, further comprising inferring a future operating condition of the working machine based on the at least one specific parameter.

8. The method according to claim 1, further comprising activating a clutch-cut-off function.

9. A device for controlling a transmission of a working machine, comprising:
   at least a control unit,
   a lifting mechanism,
   at least one sensor,
   the control unit and the sensor being connected with one another for the transmission of signals,
   the control unit being designed for carrying out a method of controlling the transmission of the working machine in which the at least one sensor of the working machine determines and transmits at least one specific parameter to the control unit for controlling the transmission, and the at least one specific parameter characterizes an actuation condition of the lifting mechanism, the actuation condition being a relative position of the lifting mechanism and a load condition of the lifting mechanism, a predetermined shifting strategy is adapted as a function of the at least one specific parameter, and the control unit is designed to emit a signal for adapting the shifting strategy.

10. A drive-train of a working machine comprising a drive element, and the transmission and the device according to claim 9 for controlling the transmission.

* * * * *